US012384600B2

(12) United States Patent
Berg et al.

(10) Patent No.: US 12,384,600 B2
(45) Date of Patent: Aug. 12, 2025

(54) SCREW CAP, TOOL AND METHOD FOR SCREWING A CAP ONTO A CONTAINER

(71) Applicant: Tetra Laval Holdings & Finance S.A., Pully (CH)

(72) Inventors: Håkan Berg, Tomelilla (SE); Magnus Virgili, Malmö (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 18/761,745

(22) Filed: Jul. 2, 2024

(65) Prior Publication Data

US 2024/0425238 A1 Dec. 26, 2024

Related U.S. Application Data

(63) Continuation of application No. 17/645,287, filed on Dec. 20, 2021, now abandoned, which is a (Continued)

(30) Foreign Application Priority Data

Jan. 23, 2015 (SE) .................................. 1550070-5

(51) Int. Cl.

*B65D 41/04* (2006.01)
*B67B 3/20* (2006.01)
*B67B 3/26* (2006.01)

(52) U.S. Cl.

CPC ..... *B65D 41/0414* (2013.01); *B65D 41/0471* (2013.01); *B65D 41/0485* (2013.01); *B67B 3/2066* (2013.01); *B67B 3/262* (2013.01)

(58) Field of Classification Search

CPC ............ B65D 41/0414; B65D 41/0471; B65D 41/0485; B67B 3/262; B67B 3/2066

See application file for complete search history.

(56) References Cited

U.S. PATENT DOCUMENTS

| | | | |
|---|---|---|---|
| 1,614,042 | A | 1/1927 | Pennock et al. |
| 2,804,225 | A | 8/1957 | Lee |

(Continued)

FOREIGN PATENT DOCUMENTS

| | | | |
|---|---|---|---|
| DE | 4405950 | A1 | 8/1995 |
| DE | 102009060625 | A1 | 6/2011 |

(Continued)

OTHER PUBLICATIONS

International Preliminary Report on Patentability for International Application No. PCT/EP2016/050624, mailed Apr. 19, 2017.

(Continued)

*Primary Examiner* — Joshua G Kotis
*Assistant Examiner* — Scott A Howell
(74) *Attorney, Agent, or Firm* — Renner, Otto, Boisselle & Sklar, LLP

(57) ABSTRACT

A screw cap is aligned using a loading piston by a method for aligning the screw cap and the loading piston in relation to each other, and after alignment a method for screwing a screw cap onto a threaded neck portion of a packaging container is performed. The screw cap includes a base portion having a top and a bottom surface, and an annular portion raised from the base portion, the annular portion having an inner surface and an outer surface; and at least one first threaded portion arranged on the inner surface of the annular portion. The base portion includes engagement features, such that the screw cap is configured to engage a tool with at least one complementary engagement feature in a process of screwing the cap onto the container with the complementary threaded neck portion.

9 Claims, 6 Drawing Sheets

Related U.S. Application Data continuation of application No. 15/545,650, filed as application No. PCT/EP2016/050624 on Jan. 14, 2016, now Pat. No. 11,247,815.

(56) References Cited

U.S. PATENT DOCUMENTS

| | | | | |
|---|---|---|---|---|
| 3,979,001 | A | 9/1976 | Bogert | |
| 4,156,491 | A * | 5/1979 | Lyon | B65D 41/0485 81/3.4 |
| 5,048,711 | A | 9/1991 | Weiss et al. | |
| 5,301,488 | A | 4/1994 | Ruhl et al. | |
| 5,321,935 | A * | 6/1994 | Spatz | B67B 3/208 53/53 |
| 5,588,545 | A | 12/1996 | King | |
| 6,510,675 | B1 | 1/2003 | Strässler | |
| 7,819,264 | B2 | 10/2010 | Brozell et al. | |
| 7,836,669 | B1 | 11/2010 | Cassil et al. | |
| 7,926,244 | B2 * | 4/2011 | Delen | B29C 45/0053 53/317 |
| 7,938,282 | B1 | 5/2011 | Hawry et al. | |
| 8,534,476 | B2 | 9/2013 | Brozell | |
| 8,746,486 | B2 | 6/2014 | del Solar et al. | |
| 9,623,900 | B2 | 4/2017 | Cirio | |
| 11,247,815 | B2 | 2/2022 | Berg et al. | |
| 2001/0018820 | A1 * | 9/2001 | Kitamoto | B67B 3/20 53/331.5 |
| 2002/0148205 | A1 * | 10/2002 | Takebe | B67B 3/20 53/331.5 |
| 2005/0022479 | A1 * | 2/2005 | Kitamoto | B67B 3/264 53/331.5 |
| 2011/0083405 | A1 * | 4/2011 | Dewert | B67B 3/26 53/317 |
| 2011/0290755 | A1 | 12/2011 | Taber et al. | |
| 2013/0014369 | A1 | 1/2013 | Schulthess | |
| 2018/0002074 | A1 | 1/2018 | Berg et al. | |

FOREIGN PATENT DOCUMENTS

| | | | |
|---|---|---|---|
| EP | 1389587 | A1 | 2/2004 |
| EP | 1132331 | B1 | 12/2004 |
| EP | 1508527 | A1 | 2/2005 |
| EP | 1270433 | B1 | 2/2011 |
| EP | 2804818 | A1 | 11/2014 |
| EP | 2832680 | B1 | 2/2017 |
| GB | 1449174 | A | 9/1976 |
| JP | S561574 | B2 | 1/1981 |
| JP | H06115591 | A | 4/1994 |
| JP | H11124196 | A | 5/1997 |
| JP | 2000327086 | A | 11/2000 |
| JP | 2011195194 | A | 10/2011 |
| RU | 34523 | U1 | 12/2003 |
| WO | 2007106006 | A1 | 9/2007 |
| WO | 2011029617 | A2 | 3/2011 |
| WO | 2012020637 | A1 | 10/2013 |
| WO | 2014060893 | A1 | 4/2014 |
| WO | 2014176287 | A1 | 10/2014 |
| WO | 2016116344 | A1 | 7/2016 |

OTHER PUBLICATIONS

International Search Report and Written Opinion for International Application No. PCT/EP2016/050624, mailed Apr. 14, 2016.
International Search Report and Written Opinion for International Application No. PCT/EP2016/059933, mailed Jul. 18, 2016.
Search Report for Swedish National Application No. 1550588-6, mailed Jan. 8, 2016.
Search Report for Swedish National Application No. 1550070-5, mailed Aug. 21, 2015.

* cited by examiner

SCREW CAP, TOOL AND METHOD FOR SCREWING A CAP ONTO A CONTAINER

TECHNICAL FIELD

The present invention is related to a screw cap for containers with a threaded neck portion made of polymer material. Furthermore, it is related to a tool for feeding a screw cap onto such a container and a packaging container for foodstuffs. Moreover, it is related to a method for aligning a threaded screw cap with a complementary threaded neck portion of a packaging container. Also, it is related to a method for screwing a screw cap comprising at least one threaded portion onto a neck portion of a packaging container.

BACKGROUND

Screw caps for containers having a threaded neck portion have been known in the art for a very long time.

Usually, both the screw cap and the neck portion are made of polymer material, comprising one or more complementary threaded portions for screwing the cap onto the neck.

In the food packaging industry, packaging containers with a bottle-like shape, having a body portion of laminated paper material and a top portion of polymer material including a threaded neck part are well known. Examples of such packaging containers are Tetra Top™, Tetra Evero™ and Tetra Evero Aseptic™ wherein the latter additionally comprises an oxygen barrier in the form of an aluminium foil as part of the laminated paper material for longer storage time of the foodstuff contained in the packaging container.

After a web of paper material is laminated with several outer polymer materials, folded and spliced to form a hollow packaging container body, a top portion comprising threaded neck part is injection moulded onto the body, which may be of different material than the top portion as evident from the packaging containers mentioned in the previous paragraph. In the next step, a screw capping unit screws a threaded cap usually made of polymer material and having threads complementary to the threaded neck part is screwed onto the neck part of the packaging container. In the ensuing step, the hollow side of the packaging container is filled with the foodstuff to be contained whereafter the hollow end of the container is folded and sealed. It should be mentioned, that in one possible and known implementation of the capping process, the hollow packaging container body including the injection moulded top portion is fed into a rotating drum and rotated to face a screw cap holder while at a distance a screw cap is fed to the screw cap holder. While both the packaging container and the screw cap holder are locked in their radial positions, the screw cap is rotatingly moved towards the top portion of the packaging container and screwed onto its neck portion.

Experience shows that a small percentage of the thus capped package containers display a misalignment between the cap and the neck part of the container.

One reason for the misalignment may be storage conditions for the caps, such as temperature and moisture, which may influence the expansion coefficients for the cap material. Another reason may be inaccuracies in the relative position of the screw application tool (chuck) and the screw cap. Such misalignment may lead to a slightly oblique application of the cap to the neck and thus either in a not sufficiently sealed container, damaged threaded portions on the neck part and the cap itself or too easy opening of the bottle. Containers with these deviations need to be discarded.

In any case, it would be desirable to solve at least some of the problems mentioned earlier leading to better sealing of the capped packaging container and a lower discard rate.

SUMMARY

At least some of the problems with existing technology are solved by a screw cap according to claim 1 of the present invention.

Preferred embodiments are given in the dependent claims.

According to one aspect of the present invention, a solution is provided by a screw cap for containers with a threaded neck portion, where the screw cap comprises a base portion with a top and a bottom surface (214), an annular portion raised from the base portion which has an inner and an outer surface (222), at least one first threaded portion arranged on the inner surface of the annular portion, wherein the base portion comprises at least one engagement portion, such that the screw cap is configured to engage a tool with at least one complementary engagement portion in a process of alignment of the screw the cap and a complementary threaded neck portion.

In one embodiment, the engagement portion of the screw cap may be located on the inner surface of the base portion. The inner surface is defined as the surface of the base portion facing a pouring opening of the container defined by its neck portion.

In other embodiment, the engagement portion above may be at the outer surface of the screw cap's base portion, where the outer surface is defined as the surface of the base portion facing away from the pouring opening of the container.

While the engagement portion may have many variations, in one embodiment of the screw cap, the engagement portion may comprise at least one protrusion.

Otherwise, the engagement portion may also be formed by at least one protrusion and a recess adjacent to it. It is contemplated to have the at least one protrusion and recess located in close proximity to each other. In this fashion, movement of a tool during engagement of its shoulder portions complementary to the one or more recesses of the engagement portions is reduced.

To obtain an even better alignment of the above screw cap with a threaded neck portion of a packaging container the at least one protrusion of the engagement portion may be vertically aligned with the starting part of the at least one threaded portion on the screw cap.

In one variant, there may be three protrusion-recess pairs arranged along a circular circumference of the inner surface of the screw cap, where one end of each protrusion is vertically aligned with the starting parts of three threaded portions arranged along the inner surface of the annular portion. Another aspect of the present invention is defined by a tool according to claim 9. The tool according to the present invention is suitable for feeding the screw cap described earlier to a screw cap holder and comprises a body, a top end portion in contact with the body which is arranged to engage the screw cap, a bottom end portion in contact with the body comprising means for mounting the tool onto a tool holder and at least one engagement portion for engaging at least one complementary engagement portion on the screw cap when rotating the screw cap around the tool.

In one embodiment of the tool, the engagement portion may be a shoulder portion.

In this way the shoulder or shoulders of the tool will engage the complementary engagement portion on the screw cap and lock the position of the screw cap.

Corresponding to the embodiment of the screw cap described in the last paragraph dealing with the screw cap, the top end portion of the tool may be made so that it comprises three shoulder portions arranged along a circular circumference of the top end portion where the shoulders are radially aligned with the center of top end portion.

The screw cap may be applied to a packaging container for foodstuffs itself comprising a body portion and a threaded neck portion of polymer material.

Yet another aspect of the present invention is defined by a method for aligning a threaded screw cap with a complementary threaded neck portion of a packaging container. According to the method, a screw cap holder is positioned, such that it faces a screw cap feeding too from which it receives the screw cap. The screw cap holder is rotated until there is an engagement between the engagement portion in the screw cap and a complementary engagement portion in the feeding tool. The axial position of the screw cap holder is recorded and the screw cap is disengaged from the feeding tool.

It may also be mentioned that the screw cap holder may move towards the feeding tool or both the screw cap holder and the feeding tool may move towards each other.

Disengagement may be performed by rotating the screw cap away from engagement and retracting the screw cap from the feeding tool.

Finally, yet another aspect of the present invention is defined by a method for screwing a screw cap to a neck portion of a packaging container comprising at least one complementary threaded portion.

The method is performed by positioning a screw cap holder which is holding the screw cap, such that it faces the threaded portion of a packaging container and such that their symmetry axes are aligned. The screw cap holder rotates the screw cap to a predefined axial position recorded during an alignment step with a screw cap feeding tool. The screw cap holder moves towards the packaging container or vice versa rotating the screw cap holder and thus the screw cap in the direction of engagement with the threaded portion of the packaging container, such that the cap is screwed onto the threaded portion.

In this way, the screw cap will always have a well-defined axial position in relation to the neck portion of the packaging container onto which it is screwed and misalignments are minimized.

DETAILED DESCRIPTION

Embodiments of the present invention will be described in more detail below with reference to the accompanying drawings in order for those skilled in the art to be able to carry out the invention. The invention may, however, be embodied in many different forms and should not be construed as limited to the embodiments set forth herein. The embodiments do not limit the invention, but the invention is only limited by the appended patent claims. Furthermore, the terminology used in the detailed description of the particular embodiments illustrated in the accompanying drawings is not intended to be limiting of the invention.

Figure 1:
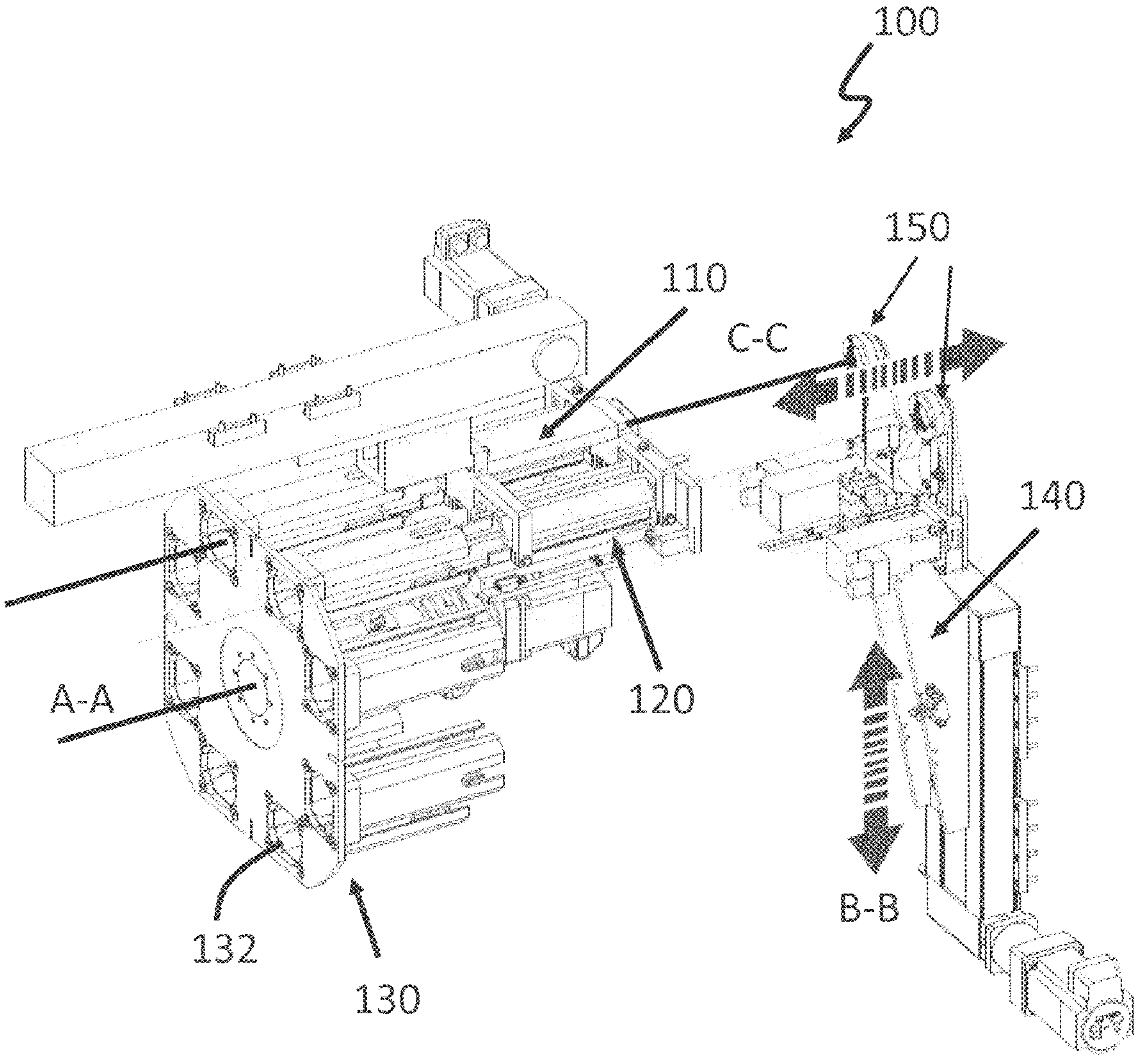
FIG. 1 displays a cap application apparatus

FIG. 1 displays a cap application assembly 100 for application of the screw cap onto a packaging container. It should be mentioned here that once the packaging laminate web is cut and folded into a hollow packaging container body and once a polymer portion comprising a threaded neck portion is injection moulded on top of the packaging container it is forwarded to the cap application assembly 100. The cap application assembly 100 comprises a drum 130 rotatable around an axis A-A and tubular openings 132 for receiving packaging containers. Moreover, the cap application assembly 100 comprises a stripper unit 110 which feeds the packaging containers from the drum 130 onto a capping station where a screw cap is applied to threaded neck portion of the packaging container. The stripper unit 110 then moves the packaging container away from the capping station 120 and places a new packaging container there. While a new packaging container is fed to the capping station 120, a screw cap application unit 140 moves downward along the B-B axis and forward along the C-C axis in the direction of the arrows in FIG. 1 (forward meaning towards the drum 130) to pick up a screw cap from a screw cap handling unit (not shown). The screw cap is fed on a piston (not shown) into a screw cap holder or chuck 150. Then, the screw cap application unit 140 moves up along the B-B axis and backward along the A-A axis in the direction of the arrows (i.e. away from the drum 130) in order to position the chuck 150 holding the screw cap in front of the package in the capping station 120. Finally, the screw cap application unit 140 rotates the chuck 150 while the packaging container is moved towards the chuck 150. In this fashion the screw cap held in the chuck 150 is screwed onto the threaded neck portion of the packaging container. Once the screwing step has been completed, the stripper unit 110 moves the thus closed packaging container away from the capping station 120 to the package filling step where the packaging containers, which are hollow on the end opposite the cap end, are filled with foodstuff and where the open end of the packaging container is folded together and sealed. At the same time a new packaging container is fed to the capping station and 120 and the screw application cycle starts all over again.

Figure 2A:
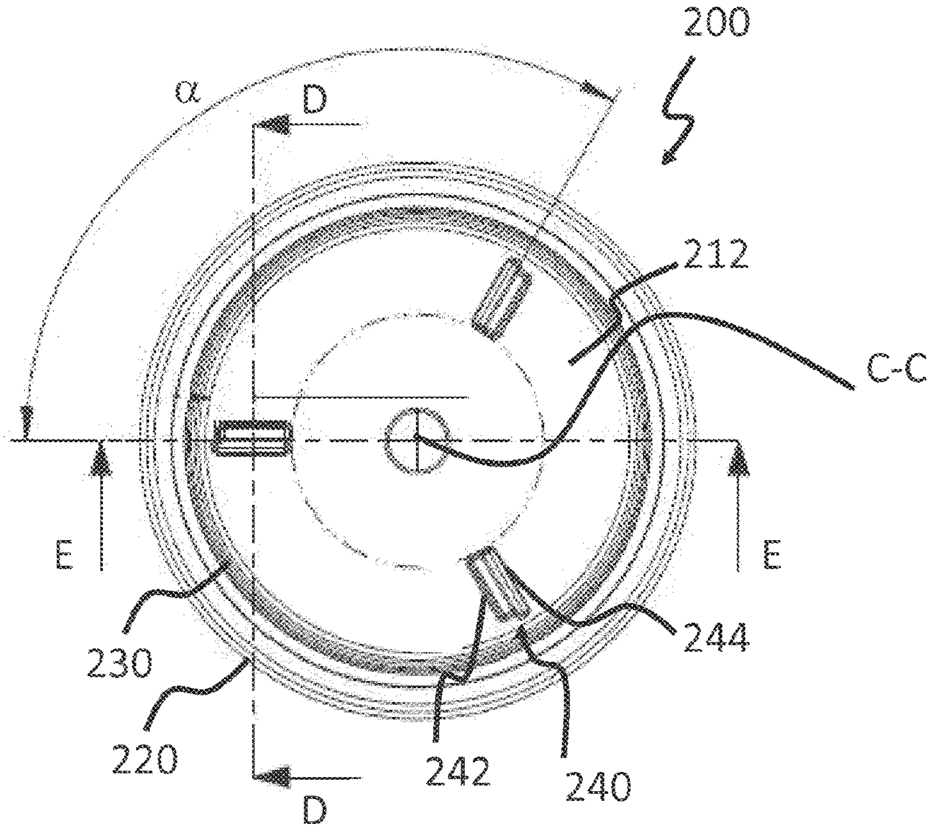
FIGS. 2A-2C display one embodiment of the screw cap according to the present invention.
Figure 2B:
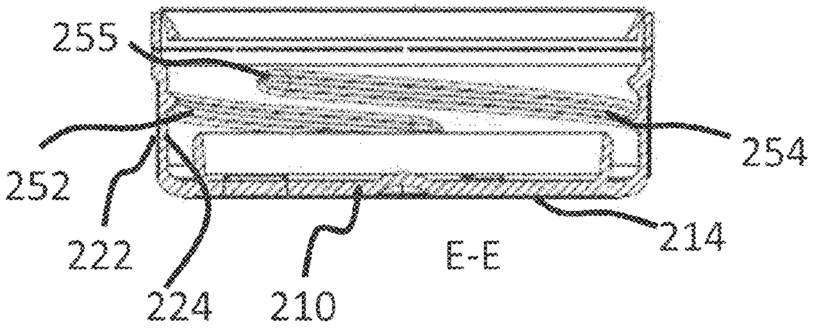

FIG. 2A is a top view of a screw cap 200 for packaging containers according to one embodiment of the present invention. As can be seen in FIG. 2B the example screw cap essentially comprises a base part 210 with a top and bottom surface 212 and 214, the bottom surface 214 being orientated towards the opening spout of a packaging container (not shown) onto which the screw cap is to be applied. The screw cap further comprises a first raised annular portion 220 extending from the base part 210 in the direction of the bottom surface 212 of the same and extending along the circumference of the base part. This annular portion is held by the cap holder 150 in cap application unit described in FIG. 1 when it is prepared for being screwed onto a neck portion of a packaging container the type of which have been mentioned in the background of invention section. The outer surface of the annular portion 220 may or may not comprise vertical ribs facilitating gripping of the screw cap when the closed packaging container is to be opened. Moreover, the exemplary screw cap 200 also comprises a second raised annular portion 230 centered around the central axis C-C of the screw cap 200 and extending to a height substantially lower than the height of the first raised annular portion 220. Additionally, the screw cap 200 according to the embodiment in FIG. 2A also comprises engagement portions 240 comprising three pairs of protrusions 242 and recesses 244 arranged in the bottom surface 214. As is evident from FIG. 2A the three engagement means 240 are arranged on a circle centered around the symmetry axis C-C of the screw cap 200, where the symmetry axis C-C is perpendicular to a plane in which the bottom surface is located. In this specific embodiment, the protrusions 242 and recesses 244 are arranged parallel and in close proximity to each other. Even though the angular separation illustrated by the angle $\alpha$ between the three engagement portions 240 in FIG. 2A is around 120 degrees, the separation need not be uniform nor is the number of engagement portions 240 tied to three. Any number of engagement portions may be arranged with it without uniform separation.

FIG. 2B illustrates the screw cap 200 from FIG. 2A in a cross section along the axis A-A. The screw cap 200 comprises a number of threads on the inner surface 222 of the first raised annular portion 220 which are of which a first and a second thread 252 and 254 are shown, which make it possible to screw the cap 200 onto complementary threads arranged on a neck portion of a packaging container and thus close the container. The threads are descending when seen from the bottom surface 212 in the direction of the neck portion of a packaging container (not shown). In one possible variant of the screw cap 200, there are three threads of which one is not shown in FIG. 2B and where each thread is aligned to one engagement portion 240 illustrated in FIG. 2A. The threads and the engagement portions 240 are aligned such that the starting point of each thread, the starting point 255 of the second thread 254, for example, is vertically aligned with one end of the protrusion 242 of the engagement portion 240. The significance of this arrangement will be described later in the text.

The purpose of the engagement portion 240 is to engage a corresponding cap loading tool, such as a loading piston 300 in order for the shoulder portion arranged on the top part of the loading piston 300 to be able to engage the engagement portion 240. During a screw cap alignment procedure described further down in the text, the engagement between the screw cap 200 and the loading piston 300 will prevent further rotation of the screw cap 200. While being locked in the rotational direction due to the engagement, the locked screw cap position can be used in a later screw cap application process to hit the starting point of a complementary threaded neck portion of a packaging container. Using the protrusion and recesses 242, 244 for the engagement portion 240 in the screw cap has the added advantage that the engagement with a complementary shoulder portion of a loading piston 300 is achieved with very little play. Hence, the rotational position of the screw cap 200 achieved when being engaged to the loading piston 300 can be determined even more accurately. The reduced play between the engagement portion 240 of the screw cap 200 and the shoulder portions of the loading piston 300 will thus increase precision when applying screw cap 200 to a complementary threaded neck portion of a packaging container and therefore achieve better sealing of the container.

Figure 3A:
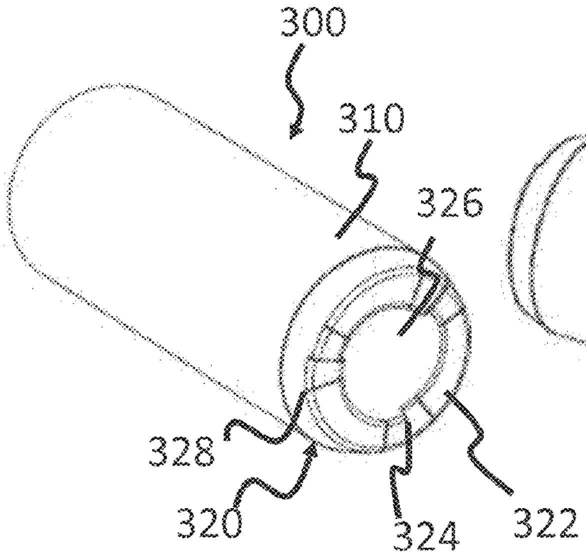
FIGS. 3A-3C display one embodiment of a loading piston according to the present invention.
Figure 3B:
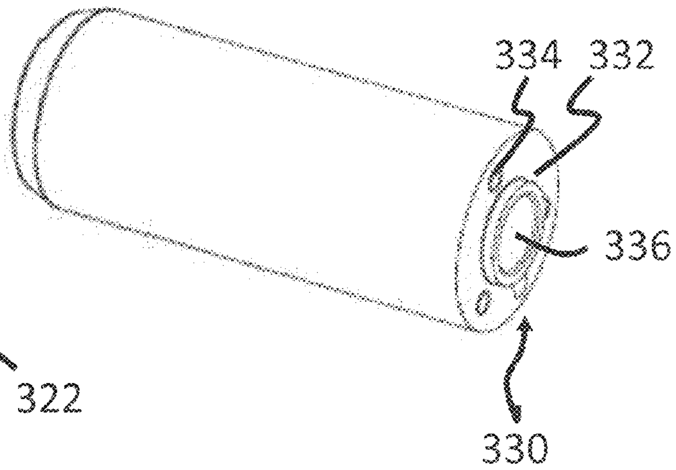
Figure 3C:
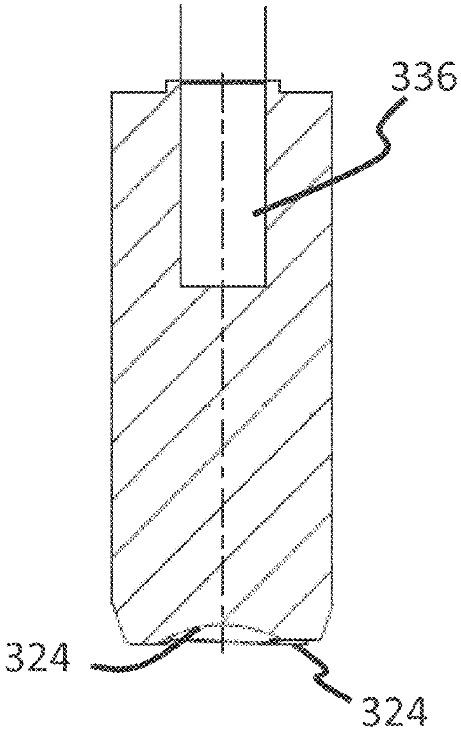

Such an exemplary loading tool is illustrated in FIGS. 3A-3C. It will be explained later in the text why this is the case.

Figure 2C:
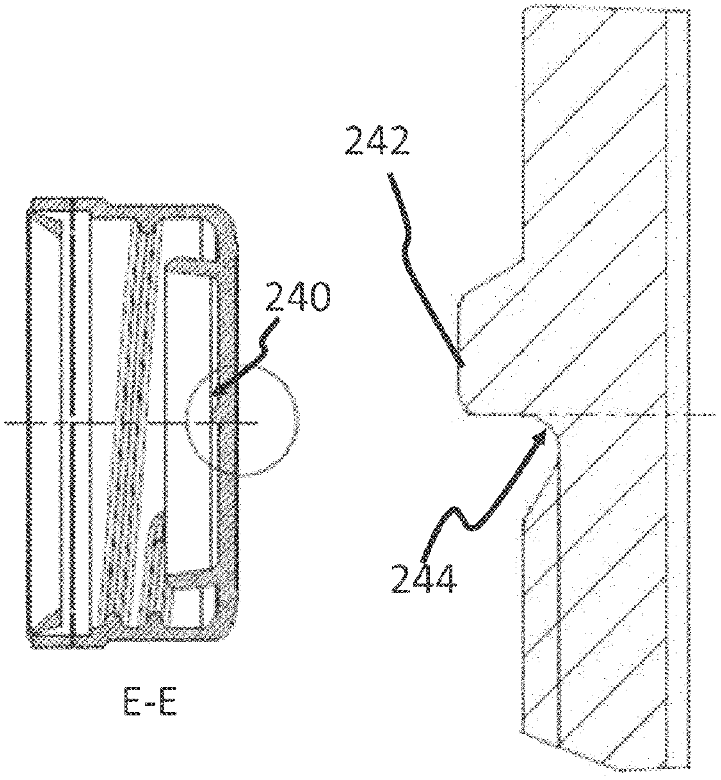

FIG. 2C displays the screw cap 200 from FIG. 2A in a cross section along the axis E-E, where especially an enlarged view of one of the engagement portions 240 discussed earlier is illustrated.

As can be seen from the enlarged view in FIG. 2C the engagement portion 240 comprises a protrusion 242 having a vertical and a horizontal portion and furthermore one declining portion. Moreover, the protrusion 242 comprises a recess 244 adjacent to the vertical portion of the protrusion 242, where the recess 244 comprises a declining portion and an arcuate portion. This structure of the engagement portion ensures that a shoulder portion of a loading piston which is engaged with the engagement portion 240 of the screw cap 200 stays in the arcuate portion of the recess 244 where its further rotational movement is restricted by the vertical portion of the protrusion 242 with very little play. It is however possible to manufacture the screw cap 200 only comprising protrusions as engagement portions, which would allow for some play between the shoulder portion of the loading piston and the engagement portion of the screw cap, but still leading to satisfactory alignment between screw cap and the neck portion of a packaging container.

Next, FIG. 3A displays an exemplary embodiment of a loading piston 300 which is used as a tool pushing the cap 200 into the chuck and for orienting it.

As can be seen in FIG. 3A, the loading piston 300 has a cylindrical shape comprising a cylindrical body 310, a top part 320 and a base 330. The top part 320 consists of a conical portion 328 on top of which resides a annular portion 322 which has shoulders 324 arranged along its circumference as complementary engagement portions. The loading piston 300 also comprises a recessed portion 326 formed in the top part 320 of the loading piston 300 in order not to contact a slight protrusion in the center of the screw cap see in FIG. 2B for example.

The function of the shoulders 324 of which three are present in this embodiment of the loading piston 300 is to engage the engagement portions 240 on the screw cap 200 in FIG. 2A. Although in this embodiment the loading piston 300 has three shoulders to match the number of engagement portions 240 on the screw cap, the loading piston 300 may have any shape for the complementary engagement portion and any number of these complementary portions which are manufactured so that they are able to engage the engagement portions on the screw cap. It should be borne in mind that the engagement means may have different shapes than the ones illustrated in FIG. 2C as long as they are able to engage the complementary engagement portions in the loading piston 300 leading to restricted movement of the loading piston 300 in the screw cap when the two are engaged.

With regards to the base 330 of the loading piston 300, it comprises a conical bore 336 and conical holes 334 for attachment to a feeding unit which is configured to feed a new screw cap into the screw cap holder 150 described in FIG. 1.

A spring (not shown) may be arranged in the conical bore 336 which tension can be used by the servo motor rotating the chuck 150 in relation to the loading piston in order to detect the position of engagement between the shoulder portion 324 of the loading piston 300 and the corresponding engagement portion 240 in the screw cap 200.

However, the presence of a spring in the conical bore 336 is not necessary for that operation.

It may also be mentioned that they may be several sets of chucks, each chuck being adapted for screwing a cap of different size and possibly adapted in its complementary engagement portion to achieve engagement with different engagement portions in different screw caps.

Next, the process of screw cap orientation and alignment in relation to a threaded neck portion of a packaging container will be explained with the help of flow charts depicted in FIGS. 4 and 5.

Figure 4:
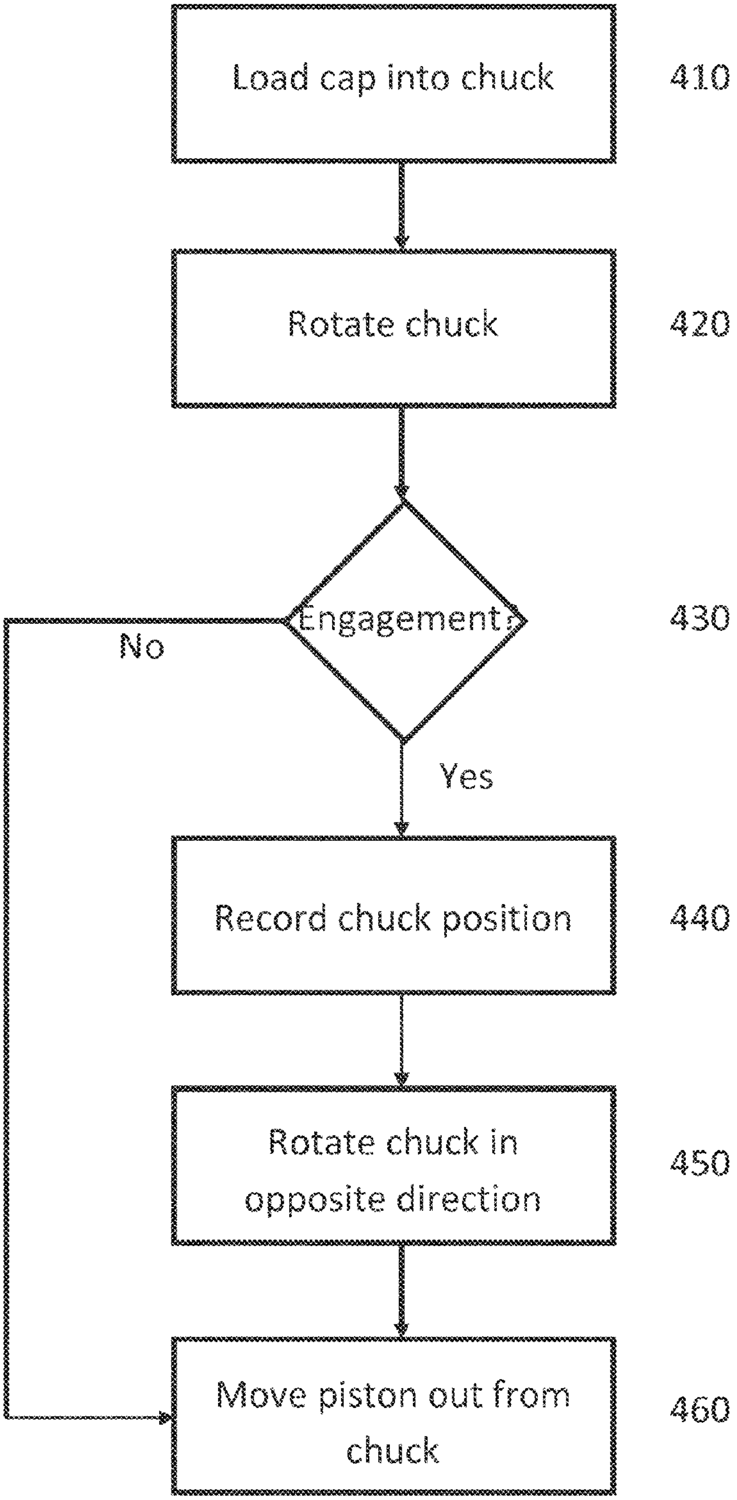
FIG. 4 displays a flow chart illustrating alignment of the screw cap and a loading tool according to one embodiment of the method of the present invention.

FIG. 4 illustrates the steps of a cap orientation method according to one embodiment of the present invention. When a screw cap is delivered by the loading piston to the chuck in the cap application unit described in FIG. 1 its rotational position with respect to its central axis C-C and its rotational position in relation to the chuck is unknown. As stated earlier in the text, this undefined rotational relation can lead to misalignment between the screw cap and the complementary threaded portion on the neck of the packaging container when the cap application unit screws the cap onto the neck portion. The purpose of cap orientation is thus to achieve a well-defined rotational position of the cap which later can be used for aligned screwing of the cap onto the packaging container.

Now, at step 410, a screw cap, such as the screw cap 200 illustrated in FIGS. 2A-2C is loaded onto a piston and held stationary there. The piston is moved along the C-C axis towards the chuck. At the same time a servo motor onto which a chuck, such as the chuck 300 illustrated in FIGS. 3A-3C, is mounted, brings the chuck into rotation along its central axis after the cap is loaded into the chuck.

Depending on the structure of the cap application unit, the servo motor onto which the chuck is mounted may move towards a stationary piston onto which the screw cap is loaded or both the servo motor together with the chuck and the piston with the screw cap may move towards each other.

At step 430, the servo motor checks whether the engagement portion of the screw cap has come into contact with the complementary engagement portion in the loading tool. This can be detected as a stop of the movement of the chuck if no special means for detecting the building up of torque are arranged. Engagement between the screw cap and the loading tool will also lead to a stop of the servo motor. At step 440 the rotational position of the chuck is then recorded, for example in an internal memory connected to the servo motor. If no engagement between the chuck and the screw cap could be detected, the servo motor stops and proceeds with capping routine without knowing the rotational alignment.

At the next step 450, the screw cap is disengaged from the engagement portion of the loading piston by being rotated by the servo motor in the opposite direction away from engagement.

Finally, at step 460, the loading piston is moved in a direction along the central axis C-C away from the chuck and cap.

After these steps have been completed, the chuck will be able to have an exactly defined rotational position in relation to the screw cap, such that the risk of misalignment between the screw cap and a threaded neck portion of a packaging container is minimized.

Figure 5:
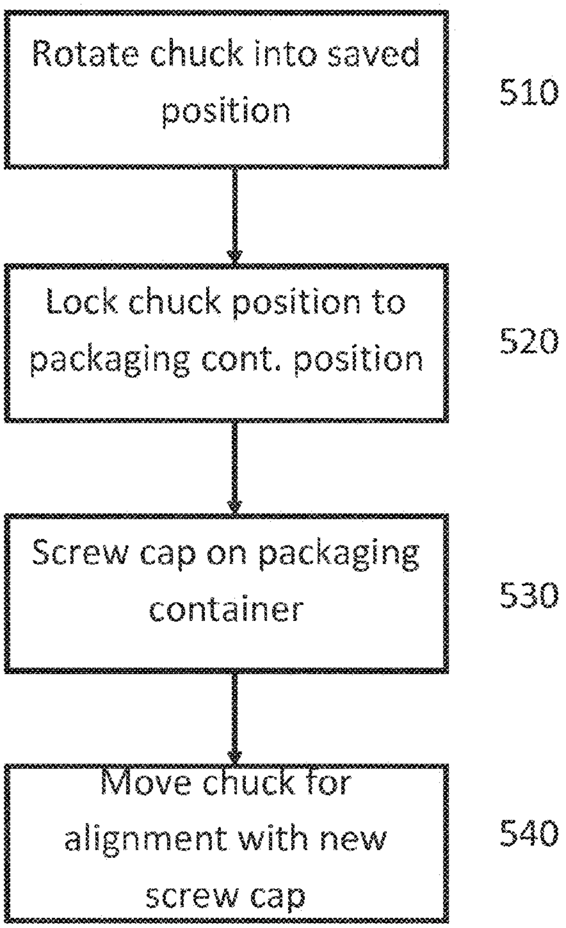
FIG. 5 displays a flow chart illustrating the screwing of the screw cap by means of a screw cap application unit according to one other embodiment of the method of the present invention.

FIG. 5 illustrates the screw cap application method according to one embodiment of the present invention in the form of a flow chart.

At step 510 the servo motor retrieves the previously saved rotational position of the chuck in relation to the screw cap and rotates the chuck into a new position in relation the saved one so when the cap and neck has engagement they hit each other perfectly aligned.

At step 530 the servo motor locks the chuck position to a specific position on the packaging container. This can be done with the help of a virtual cam shaft. Usually, using a real mechanical cam shaft one can determine how other shafts should rotate in relation to the position of the cam shaft. In this case, such a mechanical cam shaft is made virtual and the other servo motor cam shafts pivot in relation to it. In this way the start of a thread on the screw cap is aligned with a specific rotational position of the neck portion of a packaging container, so that when the cap is screwed onto the neck it hits a predefined spot on the neck portion.

Finally, at step 540, the cap is screwed on the packaging container using the steps described in FIG. 1.

It should be mentioned, that while the engagement portion in the screw cap and the loading piston have been described with respect to one specific embodiment it may be also possible to manufacture the screw cap and the loading piston, such that the engagement portion is located on the outer surface 212 of the screw cap. Also, the engagement portion in the screw cap may need to be vertically aligned with the start of a thread in the cap, but may be located a rotational distance away from it. Likewise, instead of a protrusion and recess being located in the screw cap, they may be located on the loading piston instead, while complementary engagement portions may be located in the screw cap.

The invention claimed is:

1. A method for aligning a threaded screw cap with a complementary threaded neck portion of a packaging container, comprising:

positioning a screw cap holder, such that the screw cap holder faces a screw cap feeding tool, receiving the screw cap in the screw cap holder from the feeding tool, rotating the screw cap holder until there is engagement between an engagement portion in the screw cap and a complementary engagement portion in the feeding tool, recording a rotational position of the screw cap holder, such that the screw cap holder has an exactly defined rotational position in relation to the screw cap, such that a risk of misalignment between the screw cap and the complementary threaded neck portion of the packaging container is minimized, and disengaging the screw cap from the feeding tool.

2. A method for screwing a threaded screw cap comprising aligning the threaded screw cap according to the method of claim 1, the threaded screw cap comprising at least one threaded portion that is screwed onto a neck portion of the packaging container comprising at least one complementary threaded portion, said method for screwing the threaded screw cap further comprising:

positioning the screw cap holder holding the screw cap, such that the screw cap faces the threaded portion of the packaging container and such that symmetry axes of the packaging container and the screw cap are aligned, rotating the screw cap to the predefined rotational position recorded during the recording step of the method for aligning the threaded screw cap of claim 1;

moving the screw cap holder towards the packaging container; and rotating the screw cap holder and thus the screw cap in a direction of engagement with the threaded portion of the packaging container, such that the screw cap is screwed onto the threaded portion of the packaging container.

3. The method for screwing a threaded screw cap according to claim 2, further comprising retrieving the predefined rotational position of the screw cap holder in relation to the screw cap and rotating the screw cap holder into a new position in relation the predefined rotational position such that when the screw cap and neck have engagement the screw cap and neck hit each other aligned.

4. A method of using of a screw cap comprising screwing a threaded screw cap according to claim 2, said screw cap comprising:

a base portion comprising a top surface and a bottom surface;

an annular portion raised from the base portion, the annular portion having an inner surface and an outer surface; and at least one first threaded portion arranged on the inner surface of the annular portion, wherein the base portion comprises at least one engagement portion, such that the screw cap is configured to engage said tool with said at least one complementary engagement portion in the method of alignment of the threaded screw cap with a complementary threaded neck portion of a packaging container according to claim 1.

5. The method of using of a screw cap according to claim 4, wherein the at least one engagement portion of the base portion is located on the top surface, the top surface facing a pouring opening of the packaging container defined by the complementary threaded neck portion.

6. The method of using a screw cap according to claim 4, wherein the at least one engagement portion of the base portion is located at the bottom surface of the base portion, the bottom surface facing away from the pouring opening of the container.

7. The method of using a screw cap according to claim 4, wherein the engagement portion comprises at least one protrusion and a recess adjacent to the protrusion.

8. The method of using a screw cap according to claim 4, wherein one end of the protrusion is either vertically aligned with a starting part of the at least one first threaded portion, or wherein the starting part of the at least one first threaded portion is located a rotational distance away from the vertical alignment.

9. The method using a screw cap according to claim 4, wherein the screw cap comprises three protrusions arranged along a circular circumference and each having one end, respectively, that is either vertically aligned with starting parts of three threaded portions or located a rotational distance away from such vertical alignment.

* * * * *